Feb. 19, 1957
K. M. NEWCUM
2,781,912
DRIER-FILTER
Filed March 1, 1954
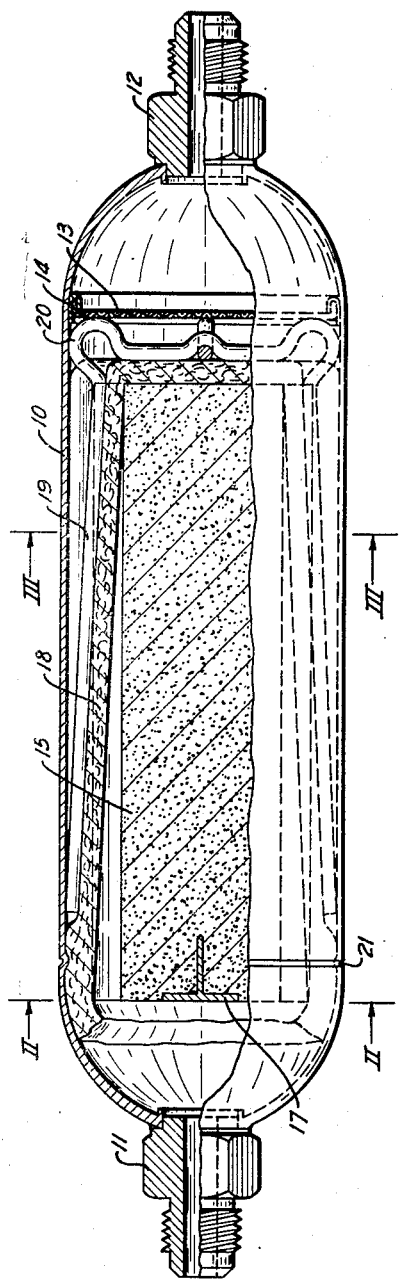
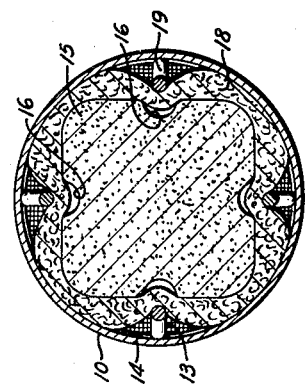
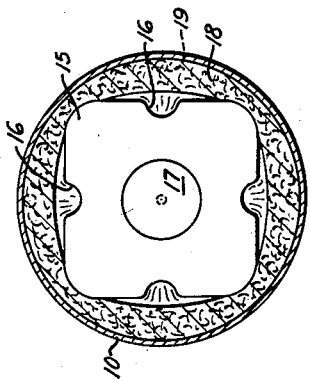
INVENTOR.
KENNETH M. NEWCUM
BY
HIS ATTORNEYS

2,781,912

DRIER-FILTER

Kenneth M. Newcum, Zelienople, Pa.

Application March 1, 1954, Serial No. 412,986

7 Claims. (Cl. 210—112)

This invention relates to a filter-drier of the type especially adapted for use in refrigeration systems.

The invention aims to provide a filter-drier of high efficiency, and having a neat, compact appearance, combined with low cost.

A particular feature of the invention resides in the fact that a molded piece of water-absorbing material is surrounded by a closed bag of filter material, and a plurality of tapered passages are formed between the filter bag and the molded material so that the fluid refrigerant is permitted to escape from the tapered passages through the filter bag. As the result of this construction the refrigerant is caused to pass over a long path in contact with the water-absorbing material, and since there are no abrupt changes of direction, nor restrictions, of the fluid flow, there is no appreciable drop in pressure of the liquid refrigerant as it passes through the device.

The material of the filter bag is of such a nature that it provides a cushioned support for the molded drier element.

These and other objects and advantages of the invention will become apparent as the description proceeds.

In the drawings:

Fig. 1 is a longitudinal section through a filter-drier constructed according to the invention.

Fig. 2 is a section on line 2—2 of Fig. 1.

Fig. 3 is a section on line 3—3 of Fig. 1.

In the drawings, which illustrate a preferred form of the invention, the numeral 10 designates a tubular body which may be formed of copper, steel, or any suitable ferrous or non-ferrous metal. The ends of the body are spun down, or otherwise reduced, to openings which receive the inlet fitting 11 and the outlet fitting 12 and are secured thereto, as by silver soldering.

In manufacturing the device, the outlet filter screen 13 is inserted in body 10. This filter screen is preferably formed of 30 x 160 mesh plain Dutch weave wire filter cloth, and its periphery is clamped in a ferrule 14 which fits snugly in body 10.

The drier element 15 is a solid molded piece of a water-absorbing material, such as anhydrous calcium sulphate. As shown, this element is substantially square in cross section with rounded corners and with flow channels 16 formed in the flat sides. Obviously, this element may have other cross-sectional shapes as long as it is provided with flow channels 16 extending longitudinally on its outside.

A target 17 of a suitable metal is molded in the inlet face of drier element 15 to eliminate erosion of element 15 by the incoming liquid.

The filter bag 18 is formed of some suitable filtering material, such as fiber glass, and is in the form of a bag completely closed except for its open mouth facing the inlet fitting 11.

The fiber glass is a "springy" material and the filter bag 18 completely surrounds the drier element 15 forming a cushioned support for this relatively fragile part.

In assembling the device, the drier element 15 is placed in the filter bag 18 with the target 17 at the open end of the bag. The wire forms 19 are then slipped over the outside of the bag 18.

The wire forms 19 are made of some suitable material such as steel, and are in the form of a spider having an arm associated with each of the flow channels 16. In the form of the invention illustrated, the drier element 15 has four sides, each having a channel 16. Hence two wire forms are used, each one being substantially U-shaped and extending along one channel 16 across the bottom of the bag 18, and along the opposite channel 16. At the bottom edges of the filter bag the forms 19 have outwardly bent legs 20 which engage the filter screen 13 so as to keep the filter bag from engaging and clogging the screen. The bent legs 20 may also engage the sides of shell 10 in order to hold the lower end of the filter and drier element in proper spaced relation to the shell.

After the wire forms 19 have been placed in position, the filter-drier element is inserted in the casing 10.

The ends of casing 10 are reduced in diameter by a spinning operation, or by attaching separate end caps to the body. The inlet fitting 11 and the outlet fitting 12 are attached to the reduced ends.

It will be seen that the inlet end of the filter bag 18 is pressed out against the inner wall of casing 10, as shown in Figs. 1 and 2, and hence the incoming liquid is forced to flow into the channels 16. The arms of the wire forms 19 converge from a position in which they contact the outer shell near the inlet end to a position in which they press the wall of the filter bag 18 into contact with the bottom walls of channels 16 at the outlet end. The result of this construction is that the wall of the filter bag 18 cooperates with the channels 16 to form a series of tapered inlet channels, and a series of conversely tapered outlet channels. In passing down the inlet channels much of the liquid is caused to travel over a long path in contact with the drier element 15. As it passes down these gradually constricted inlet channels, the liquid can flow directly through the wall of filter bag 18 into the conversely tapered outlet channels without making any abrupt change of direction. The liquid then passes through the outlet filter screen 13 to the outlet fitting 12.

The ring 21 indented on the wall of body 10 near the inlet end may be used as a permanent indication of the inlet end of the filter drier.

According to the provisions of the patent statutes, I have explained the principle of my invention and have illsutrated and described what I now consider to represent its best embodiment. However, I desire to have it understood that, within the scope of the appended claims the invention may be practiced otherwise than as specifically illustrated and described.

I claim:

1. A filter-drier of the type having an elongated casing with inlet and outlet fittings, the improvement which comprises: an elongated one-piece body of water-absorbing material forming a drier element, a filter bag of fiberglass having an open end facing the inlet fitting, the filter bag being otherwise completely closed and surrounding the drier element on all sides except at the inlet end, the inlet end of the drier element being spaced from the casing by the filter bag and being supported solely by the filter bag and the contact of the filter bag with the casing the fiber glass of the filter bag serving to protect and cushion the drier element against direct contact with other parts of the device.

2. A device as specified in claim 1 in which the body of the drier element is formed with longitudinal liquid channels on its exterior surface.

3. A filter-drier of the type having an elongated tubular casing with inlet and outlet fittings, the improvement which comprises: an elongated one-piece body of water-absorbing material forming a drier element, the body of the drier element having a plurality of flat sides, each of said flat sides being formed with an exterior longitudinal liquid channel, the liquid channels extending for the full length of the drier element a filter bag of springy filter material having an open end facing the inlet fitting, the filter bag being otherwise completely closed and surrounding and cushioning the drier element on all sides except at the inlet side.

4. A device as specified in claim 3 in which the open end of the filter bag is pressed out into contact with the entire inner periphery of the casing by the drier element.

5. A filter drier of the type having an elongated tubular casing with inlet and outlet fittings, the improvement which comprises: an elongated one-piece body of water-absorbing material forming a drier element, the body of the drier element being formed with a plurality of longitudinal liquid channels on its exterior surface, the channels extending the full length of the drier element, a filter bag having an open end facing the inlet fitting, the filter bag enclosing the drier element and extending the full length of the drier element, and having its open end pressed into contact with the inner periphery of the casing by the drier element, a wire spider having an arm associated with each of said liquid channels, each of said arms indenting the filter bag into its associated channel, the amount of indentation increasing from the inlet end to the outlet end, to form a tapered channel between the drier element and the filter bag, and to form a reversely tapered channel between the filter bag and the inner wall of the casing.

6. A filter drier of the type having an elongated tubular casing with inlet and outlet fittings, the improvement which comprises: a circular wire screen positioned transversely of the casing near the outlet end, an elongated one-piece body of water-absorbing material forming a drier element, the body of the drier element being formed with a plurality of liquid channels on its exterior surface, the channels extending the full length of the drier element, a filter bag having an open end facing the inlet fitting, the filter bag completely enclosing the drier element except at the inlet end, the filter bag having its open end pressed outwardly into contact with the inner periphery of the casing by the drier element, a U-shaped wire member which extends across the outlet end of the filter bag and which has arms extending toward the inlet fitting, each of said arms being associated with one of said liquid channels and indenting the filter bag into its associated channel, the amount of indentation increasing from the inlet end to the outlet end, to form a tapered channel between the drier element and the filter bag, and to form a reversely tapered channel between the filter bag and the inner wall of the casing.

7. A device as specified in claim 6 in which each of said wire arms has an outwardly bent leg which engages the wire screen and the wall of the tubular casing.

References Cited in the file of this patent

UNITED STATES PATENTS

| | | |
|---|---|---|
| 677,893 | Maignen | July 9, 1901 |
| 1,463,006 | Dardani | July 24, 1923 |
| 1,882,078 | Hennings | Oct. 11, 1932 |
| 2,021,452 | Kuenzli et al. | Nov. 19, 1935 |
| 2,183,877 | Wilkinson et al. | Dec. 19, 1939 |
| 2,283,989 | Henry | May 26, 1942 |
| 2,286,434 | Myers et al. | June 16, 1942 |
| 2,583,812 | Briggs et al. | Jan. 29, 1952 |
| 2,647,636 | Rafferty | Aug. 4, 1953 |
| 2,682,268 | Ryan et al. | June 29, 1954 |
| 2,686,596 | Storms | Aug. 17, 1954 |